United States Patent
Lagreve et al.

(10) Patent No.: US 6,303,866 B1
(45) Date of Patent: Oct. 16, 2001

(54) SELF-ADJUSTING CABLES AND METHOD FOR MAKING SAME

(75) Inventors: Christian Lagreve, Lonlay l'Abbaye; Alain Brault, Parigny; Laurent Lucas, Saint Jean du Corail, all of (FR)

(73) Assignee: Acome Societe Cooperative Detravailleurs (FR)

(*) Notice: Subject to any disclaimer, the term of this patent is extended or adjusted under 35 U.S.C. 154(b) by 0 days.

(21) Appl. No.: 09/367,195

(22) PCT Filed: Dec. 8, 1998

(86) PCT No.: PCT/FR98/02657

§ 371 Date: Oct. 15, 1999

§ 102(e) Date: Oct. 15, 1999

(87) PCT Pub. No.: WO99/30334

PCT Pub. Date: Jun. 17, 1999

(30) Foreign Application Priority Data

Dec. 8, 1997 (FR) .................................................. 97 15501

(51) Int. Cl.⁷ .................................................. H01B 7/00
(52) U.S. Cl. ............................... 174/110 R; 174/110 SR; 174/113
(58) Field of Search ............................... 174/110 R, 118, 174/118 R, 120 R, 36, 110 SR, 113 R, 113 C, 115

(56) References Cited

U.S. PATENT DOCUMENTS

| | | | |
|---|---|---|---|
| 3,861,029 | 1/1975 | Johannsen et al. | 29/611 |
| 4,242,573 * | 12/1980 | Batiwalla | 219/528 |
| 4,315,237 | 2/1982 | Middleman et al. | 338/22 R |
| 4,388,607 | 6/1983 | Toy et al. | 338/225 D |
| 4,588,855 * | 5/1986 | Kutsuwa et al. | 174/120 |
| 4,866,253 * | 9/1989 | Kamath et al. | 219/548 |
| 4,876,440 * | 10/1989 | Kamath et al. | 219/548 |
| 5,296,522 * | 3/1994 | Vogt et al. | 524/300 |
| 5,321,079 | 6/1994 | Torre et al. | 825/66 |
| 5,321,119 | 6/1994 | Torre et al. | 828/338 |
| 5,741,842 * | 4/1998 | Huggins et al. | 524/500 |
| 5,798,418 * | 8/1998 | Ouirk | 525/314 |

FOREIGN PATENT DOCUMENTS

| | | |
|---|---|---|
| 0 040 537 | 11/1981 | (EP) . |
| 0 283 237a | 9/1988 | (EP) . |
| 0 307 205 | 3/1989 | (EP) . |
| 93/08234 | 4/1993 | (WO) . |
| 93/19127 | 9/1993 | (WO) . |

OTHER PUBLICATIONS

Patent abstracts of JP 02296861 Jul. 12, 1990.
Properties of Poly(butylene Terephthalate) Functionalized Polyolefin Blends from Kang and Kim Polymer Engineering and Science, Mar. 1997, vol. 37, No. 3, pp. 603–614.

* cited by examiner

Primary Examiner—Dean A. Reichard
Assistant Examiner—William H. Mayo, III
(74) Attorney, Agent, or Firm—Piper Marbury Rudnick & Wolfe

(57) ABSTRACT

The present invention relates to a self-adjusting cable of which the material having PTC behavior is an extrudable alloy of compatible polymers of from 20% to 50% of at least one polar polyolefin, of from 50% to 80% of at least one matrix polymer chosen from poly($C_1$–$C_4$-alkylene) terephthalates, polyamides, polycarbonates, polyester and polyether copolymers, polyketones and methyl polymethacrylates, or mixture thereof, and of from 5% to 15%, preferably 5% to 10% of at least one conductive filler such as carbon black, and optionally non-conductive fillers. It also relates to the process for the production of said self-adjusting cable.

11 Claims, 2 Drawing Sheets

SELF-ADJUSTING CABLES AND METHOD FOR MAKING SAME

This application is a continuation of copending application Ser. No. 09/367,196 filed Oct. 12, 1999.

This continuation application of international application PCT/FR98/02657, filed Dec. 8, 1998.

FIELD OF THE INVENTION

The invention relates to self-adjusting cables of any structure wherein the material having PTC behaviour, that is, having a positive temperature coefficient, is an alloy of compatible polymers. The invention also relates to the process for the production of self-adjusting cables wherein the alloy having PTC behaviour is employed by extrusion without an additional cross-linking or heat treatment step around electrically conductive strands.

BACKGROUND OF THE INVENTION

The self-adjusting cables currently on the market are of two types: either the polyethylene type or the fluorinated polymer type as described in patent EP 40 537.

However, self-adjusting cables of the polyethylene type must be cross-linked or, as described in the U.S. Pat. No. 3,861,029, they must undergo a supplementary heat treatment of the post-cure type, which increases their cost. For their part, self-adjusting cables of the fluorinated polymer type have the disadvantage of being brittle and expensive.

There is, therefore, a real need for extrudable, economical, self-adjusting cables having an excellent ratio of starting current intensity to maximum current intensity, and an excellent linear power and good stability towards aging.

BRIEF SUMMARY OF THE INVENTION

Much to their credit, the Applicants, after considerable research, found a self-adjusting cable having all these characteristics. Said self-adjusting cable is characterised in that the material having PTC behaviour is an alloy of compatible polymers comprising, the percentages being expressed by weight with respect to the weight of said polymers:

from 20% to 50% of at least one polar polyolefin, from 50% to 80% of at least one "matrix" polymer chosen from the group comprising poly($C_1$–$C_4$-alkylene) terephthalates, polyamides, polypropylenes, polycarbonates, polyester and polyether copolymers, polyketones and methyl polymethacrylates, from 5% to 15%, preferably from 5% to 10% of conductive fillers such as carbon black, and optionally non-conductive fillers.

In the present invention, the term "alloy of compatible polymers" means a mixture of at least two polymers which are immiscible but which are compatible, or a mixture of at least two immiscible and incompatible polymers but which are rendered compatible by the addition of a compatibilizer. The use of such an alloy of compatible polymers by extrusion makes it possible to obtain a composite structure.

According to the invention, the polar polyolefin contained in the composition of the alloy having PTC behaviour is not very crystalline. Preferably, it is an elastomer and it is chosen from the copolymers of ethylene/vinyl acetate, ethylene/$C_1$–$C_4$-alkyl acrylate, or mixtures thereof. More preferably, a copolymer of ethylene/ethyl acrylate or ethylene/methyl acrylate is used.

The matrix polymer of the alloy having PTC behaviour is chosen from polypropylenes, polyesters, and aliphatic polyketones, polyamides, polycarbonates, copolymers of polyester and polyether, or mixtures thereof. If this polymer is a polyester, it is preferable to use poly($C_1$–$C_4$-alkylene) terephthalates, such as polybutylene terephthalate or polyethylene terephthalate. Polybutylene terephthalate is preferred. The aliphatic polyketone sold by SHELL under the brand name CARILLON® and by BP under the brand name KETONEX® may be mentioned by way of example.

Said matrix polymer has a high melting point, this melting point determining the maximum use temperature of the cable according to the invention.

The polymer is generally crystalline with the exception of polyethylene terephthalate, which may be used in the present invention in the crystalline or amorphous form.

The alloy having PTC behavior may incorporate various additives, for example, antioxidants and non-conductive fillers.

The choice of additives will, of course, depend on the final use envisaged for the self-adjusting cable according to the invention.

For cost reasons, the conductive filler is preferably carbon black. Of course, any other conductive filler may be used alone or in mixture, particularly with carbon black.

The self-adjusting cable according to the invention has an excellent ratio of starting current intensity to rated current intensity and an excellent linear power and entirely satisfactory ageing characteristics.

The self-adjusting cables according to the invention preferably have the following characteristics:

ratio of starting current intensity to rated current intensity at 10° C., less than 3, preferably less than 2, and more preferably less than 1.5; and linear power at 10° C. between 5 W/m and 130 W/m measured according to the standard DIN VDE 0254.

The present invention also relates to a process characterized in that it comprises the following steps wherein:

the various constituents of the alloy having PTC behavior described above are mixed, the mixture thus obtained is extruded in the form of granular products, said granular products are then extruded around electrically conductive strands without the use of either a cross-linking step or a heat treatment step, the strip thus formed is covered with an electrically insulating material, then the whole assembly is inserted in a protective metal sleeve, and finally the sleeve is surrounded by an insulating sheath.

These cables are thus produced without cross-linking or heat treatment, by extruding the alloy having PTC behaviour around conductive cables.

BRIEF DESCRIPTION OF SEVERAL VIEWS OF THE DRAWINGS

The present invention will now be described in more detail with references to the attached drawings on which.

DETAILED DESCRIPTION OF THE INVENTION

Figure 1:
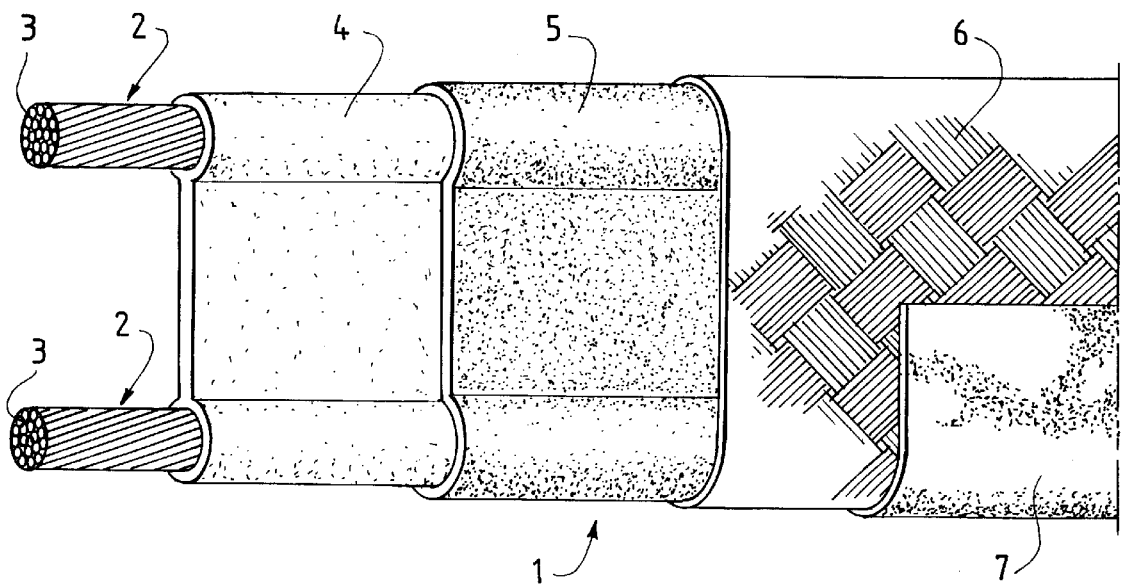
FIG. 1 represents an exploded view of a self adjusting cable according to the invention.

On FIG. 1, the self-adjusting cable 1 according to the invention is composed of two strands 2 of wires 3 of nickel-plated copper. Said strands are parallel to one another and arranged longitudinally in cable 1 along the two opposite edges of said cable. Said strands are kept in position by extrusion around them of a strip 4 of alloy of compatible polymers having PTC behaviour as described above. Around said strip 4 is extruded a layer 5 of insulating material such as flame-retardant polypropylene or ethylene chlorotrifluoroethylene. A sleeve 6 composed of a metal braid is arranged around the layer 5 of insulating material. The whole assembly is protected by an insulating external sheath 7.

EXAMPLE 1

Preparation of an Alloy of Compatible Polymers According to the Invention for a Self-adjusting Cable 60% of polybutylene terephthalate with the brand name VESTODUR® 3000 produced by HÜLS, 20% of ethylene/methyl acrylate copolymer of the 24 MA005 type produced by ELF ATOCHEM, and 20% of ethylene/ethyl acrylate copolymer containing 37% of carbon black filler sold under the brand name LE7704® by BOREALIS are mixed in an extruder.

The mixture thus comprises about 8 wt. % of carbon black.

Said mixture is extruded at 260° C. Granular products are thus obtained which are extruded again in the form of a flat strip containing at its two parallel edges copper strands in order to produce a self-adjusting strip 4 according to FIG. 1.

No cross-linking or any additional heat treatment are required.

The strip 4 thus obtained has the following characteristics:

thickness: 1.7 mm width: 8.2 mm ratio of starting current intensity to rated current intensity, at 10° C.: 1.4

Figure 2:
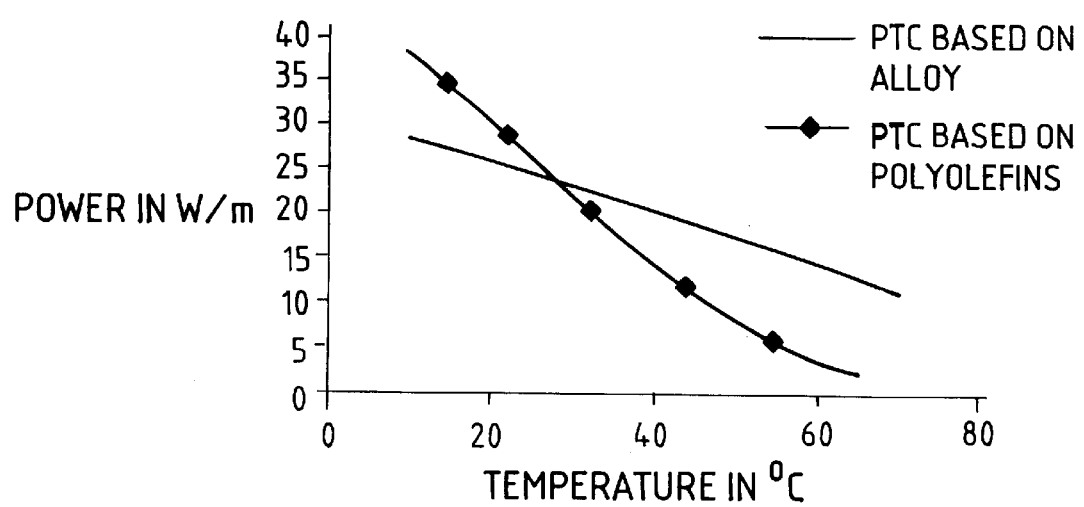
FIG. 2 represents the curves of linear power as a function of temperature of a self-adjusting cable according to the invention, and of a self-adjusting cable of the prior art.

The curve of linear power as a function of temperature is represented on FIG. 2.

Figure 3:
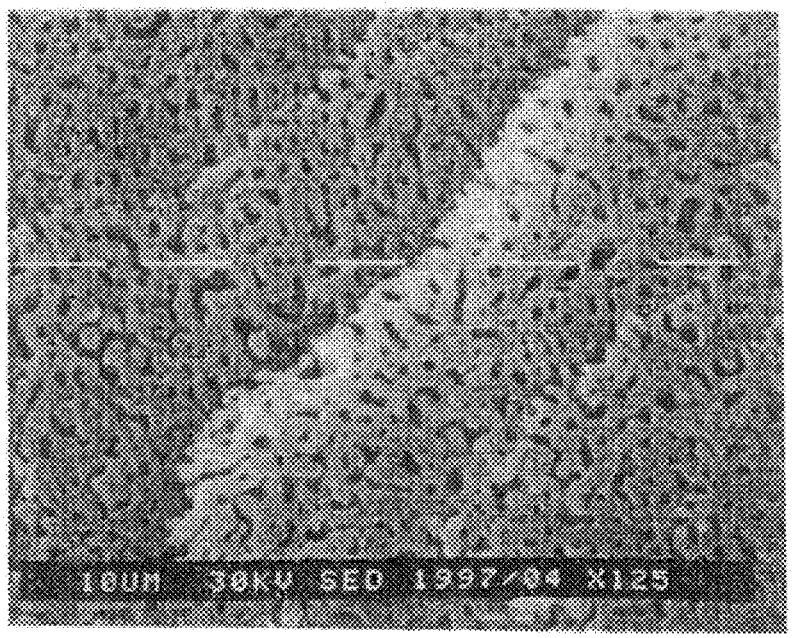
FIGS. 3 and 4 represent electron microscope photographs showing the composite structure of the material of an alloy of compatible polymers used in a PTC cable according to the invention, after extraction of the polar olefin, in magnifications of 1250 and 640 respectively.
Figure 4:
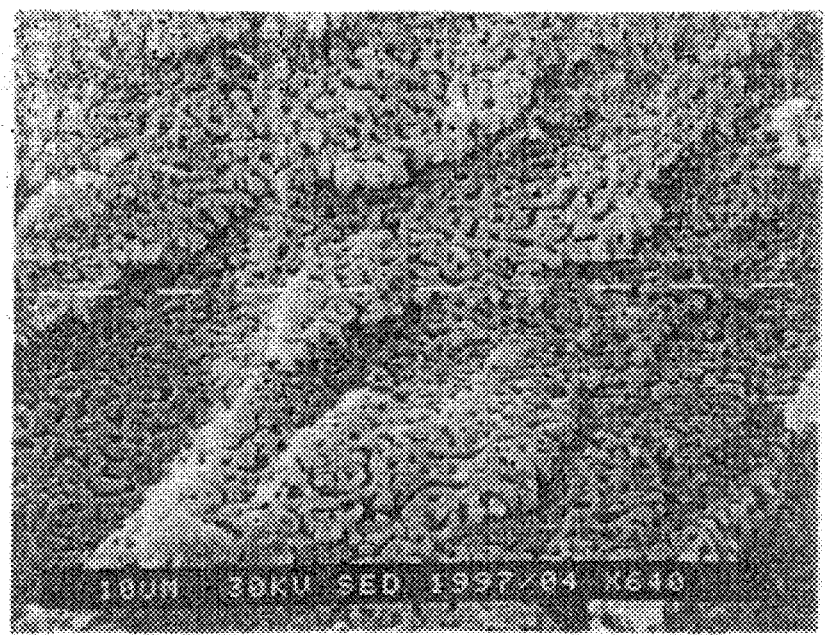

The copolymers are then extracted and an electron microscope photograph of the structure of the resulting material is obtained. The photographs are given on FIGS. 3 and 4.

EXAMPLE 2 (comparison)

Self-adjusting Cables of the Polyolefin Type

A mixture of polyethylene-ethylene/ethyl acrylate 60/40 was extruded around two strands of copper wire then cross-linked.

The strip thus obtained has the following characteristics:

thickness: 1.45 mm width: 8.2 mm ratio of starting current intensity to rated current intensity at 10° C.: 3.3

The curve of linear power as a function of temperature is represented on FIG. 2.

What is claimed is:

1. A self-adjusting cable wherein the material having a PTC behavior (positive temperature coefficient) is an extrudable alloy of compatible polymers comprising, expressed in percentages by weight with respect to the weight of said polymers:

from 20% to 50% of at least one polar polyolefin, from 50% to 80% of a least one matrix polymer chosen from poly($C_1$–$C_4$-alkylene) terephtalates, polyamides, polycarbonates, polyester and polyether copolymers, polyketones and methyl polymethacrylates or mixtures thereof, from 5% to 15% of conductive fillers, and, optionally, non conductive fillers, said adjusting cable having:

a ratio of starting current intensity to maximum current intensity, at 10° C., of less than 3, and a linear power at 10° C. between 5 W/m and 130 W/m measured according to the standard DIN VDE 0254.

2. A self-adjusting cable according to claim 1, comprising from 5% to 10% of conductive fillers.

3. A self-adjusting cable according to claim 1, wherein the conductive fillers is carbon black.

4. A self-adjusting cable according to claim 1, wherein the at least one polar polyolefin is chosen from ethylene/vinyl acetate copolymers, ethylene/$C_1$–$C_4$-alkyl acrylate copolymers or mixtures thereof.

5. A self-adjusting cable according to claim 4, wherein the at least one polar polyolefin is ethylene/ethyl acrylate or ethylene/methyl acrylate.

6. A self-adjusting cable according to claim 1, wherein the at least one matrix polymer is crystalline.

7. A self-adjusting cable according to claim 6, wherein the at least one matrix polymer is polybutylene terephthalate.

8. A self-adjusting cable according to claim 1, wherein the alloy further comprises at least one stabilizer.

9. A self-adjusting cable according to claim 1, wherein the ratio of starting current intensity to maximum current intensity, at 10° C., is less than 2.

10. A self-adjusting cable according to claim 9, wherein the ratio of starting current intensity to maximum current intensity, at 10° C., is less than 1.5.

11. A process for the production of a self-adjusting cable without cross-linking or heat treatment according to claim 1, comprising the following steps wherein:

various components of an alloy having PTC behavior are mixed to obtain a mixture, the mixture thus obtained is extruded to obtain granular products, the granular products are extruded around electrically conductive strands without the use of either a cross-linking or heat treatment step to form a strip, the strip thus formed is then covered with an electrically insulating material to obtain a whole assembly, then the whole assembly is inserted in a protective metal sleeve, finally, the sleeve is surrounded by an insulating sheath.

* * * * *